No. 834,742. PATENTED OCT. 30, 1906.
G. A. LUTZ.
CONDUIT FOR ELECTRIC CONDUCTORS.
APPLICATION FILED OCT. 26, 1905.
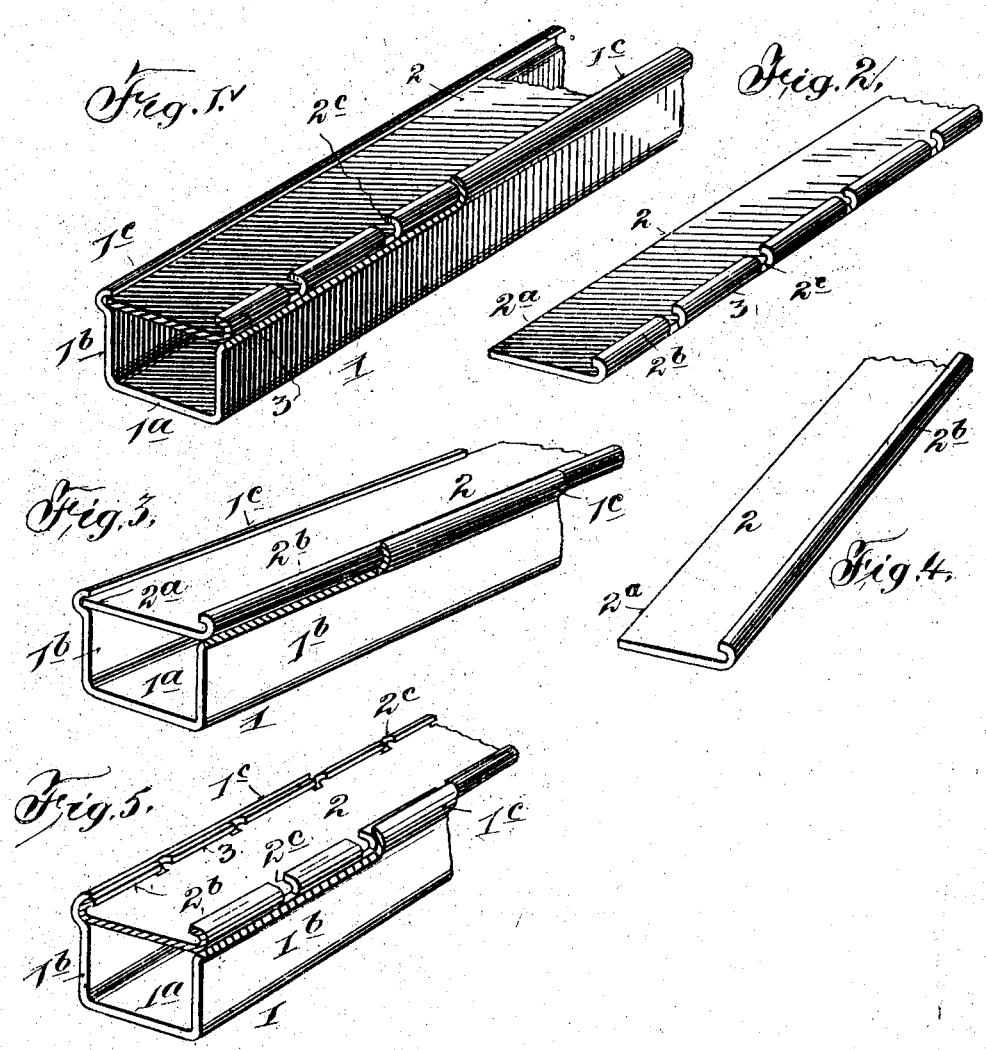
Witnesses
C. W. Benjamin
M. Hollingshead
Inventor
Geo. A. Lutz.
By his Attorney
T. F. Bourne

UNITED STATES PATENT OFFICE.

GEORGE A. LUTZ, OF NEW YORK, N. Y.

CONDUIT FOR ELECTRIC CONDUCTORS.

No. 834,742.  Specification of Letters Patent.  Patented Oct. 30, 1906.

Application filed October 26, 1905. Serial No. 284,474.

*To all whom it may concern:*

Be it known that I, GEORGE A. LUTZ, a citizen of the United States, residing in New York city, borough of Brooklyn, State of New York, have invented certain new and useful Improvements in Conduits for Electric Conductors, of which the following is a specification.

My invention relates to improvements in the class of conduits or ducts for electric conductors having a removable cover to permit convenient insertion of the conductors in the conduit and access to the conductors when required; and the object of the invention is to permit ready attachment of the cover to the conduit while holding the cover firmly thereto.

The invention comprises a channel-like conduit having bottom and side walls, the latter being provided with longitudinally-disposed grooves or projections at or near the edges of the open side and a removable cover therefor having an edge adapted to fit in one of the grooves of the conduit and being bent, folded, or curved at the other edge to readily spring or snap into the opposite groove in the conduit. To permit the more ready flexing of the folded or curved edge portion or portions of the cover in applying the latter to the conduit and removing it therefrom, in some cases I weaken the folded or curved portion of the cover, which may be done by cutting or slitting such portion at intervals or at suitable distances along the cover, thereby providing a plurality of independent folded, curved, or rolled projections on the cover, each of which will bend quite readily, as required. One edge of the cover may be folded or curved, while the other edge may be straight, or both edges of the cover may be folded or curved, and in the latter case one or both of the folded or curved edges of the cover may be weakened, as stated.

Reference is to be had to the accompanying drawings, forming part hereof, wherein—

Figure 1 is a perspective view, partly broken, of a portion of a conduit provided with a cover according to my invention. Fig. 2 is a perspective view of a portion of the cover shown in Fig. 1. Fig. 3 is a view similar to Fig. 1, showing the folded or curved part of the cover not weakened. Fig. 4 is a perspective view of the cover shown in Fig. 3. Fig. 5 is a perspective view showing a cover inserted in the opposed grooves of the conduit and having both folded or curved portions of the cover weakened.

Similar numerals of reference indicate corresponding parts in the several views.

The numeral 1 indicates a conduit having a bottom portion 1ª and side walls 1ᵇ, providing an open side, which walls at their edges are bent or curved at 1ᶜ, forming projections on the exterior and grooves on the interior.

2 indicates the cover for the conduit, adapted to fit in or upon the bent portions 1ᶜ thereof.

In Figs. 1, 2, 3, and 4 the cover 2 at one edge 2ª is shown straight and unbent, adapted to fit in one of the grooves 1ᶜ of the conduit, and the cover is bent, folded, or curved at the other edge 2ᵇ, presenting a rounded surface adapted to spring or snap into the corresponding grooved portion of the adjacent wall 1ᵇ. In applying said cover to the conduit the edge 2ª of the cover is first passed edgewise into one of the grooves 1ᶜ of the conduit and then the folded or rounded portion 2ᵇ is passed into the opposed grooved portion 1ᶜ of the conduit, whereby the cover is firmly and detachably held upon the conduit.

In order to permit the more ready application of the cover to the conduit and its removal therefrom, the folded or curved portion 2ᵇ of the cover may be weakened at intervals or at suitable distances apart, as by slitting or cutting away the folded part 2ᵇ, as at 2ᶜ, the metal of the folded or curved part of the cover between said weakened parts thereby being rendered more pliable or spring-like and each intermediate part 3 thus being capable of more readily bending when the cover is applied and detached than the unweakened part 2ᵇ in Figs. 3 and 4.

In Fig. 5 the cover 2 at both sides is shown folded or curved at 2ᵇ and provided with the weakened parts 2ᶜ, adapted to fit into the opposite grooves 1ᶜ of the conduit.

Where the conduit and its cover are made of relatively thin or pliable metal, the construction of the cover shown in Figs. 3 and 4 may conveniently be used, as the sides of the conduit will readily spring apart to permit the bent part 2ᵇ of the cover to be pushed into the groove 1ᶜ; but where the conduit or its cover or both are made of relatively thick or rigid metal the construction shown in Figs. 1, 2, and 5 is better adapted for ready application of the cover to its conduit and its removal therefrom by reason of the more ready flexibility of the series of independent flexible portions 3 at the sides of the cover.

Having now described my invention, what I claim is—

A conduit having opposed grooves facing each other near its open side, and a cover closing the open side of the conduit, the cover being rounded along one longitudinal edge, the rounded portion of the cover fitting in one of said grooves and the opposite edge of the cover fitting in the other groove of the conduit, substantially as described.

GEO. A. LUTZ.

Witnesses:
T. F. BOURNE,
M. HOLLINGSHEAD.